Jan. 25, 1966 R. APPENRODT 3,231,036
STAIR CLIMBING INVALID CARRIAGES
Filed May 11, 1962 9 Sheets-Sheet 1

INVENTOR.
RICHARD APPENRODT
BY
Bair, Freeman & Molinare
Attys.

Jan. 25, 1966       R. APPENRODT       3,231,036
STAIR CLIMBING INVALID CARRIAGES
Filed May 11, 1962                9 Sheets-Sheet 3

INVENTOR.
RICHARD APPENRODT
BY
Bair, Freeman & Molinare
Attys

Jan. 25, 1966  R. APPENRODT  3,231,036
STAIR CLIMBING INVALID CARRIAGES
Filed May 11, 1962  9 Sheets-Sheet 4

INVENTOR.
RICHARD APPENRODT
BY
Bair, Freeman & Molinare
Attys.

Jan. 25, 1966  R. APPENRODT  3,231,036
STAIR CLIMBING INVALID CARRIAGES
Filed May 11, 1962  9 Sheets-Sheet 5
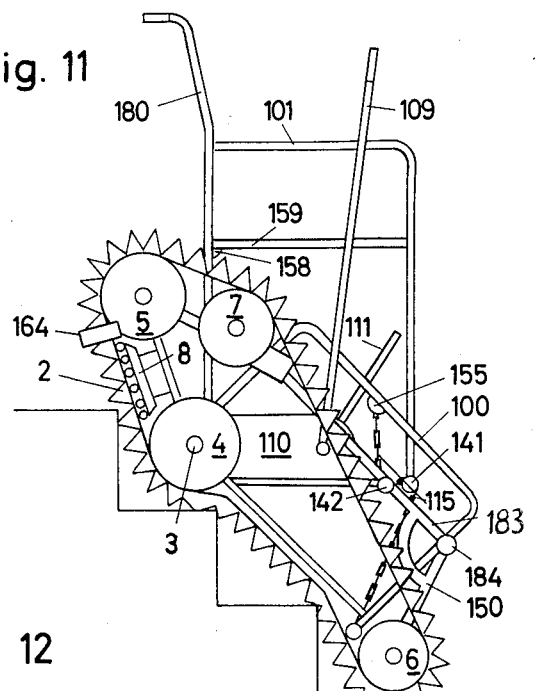
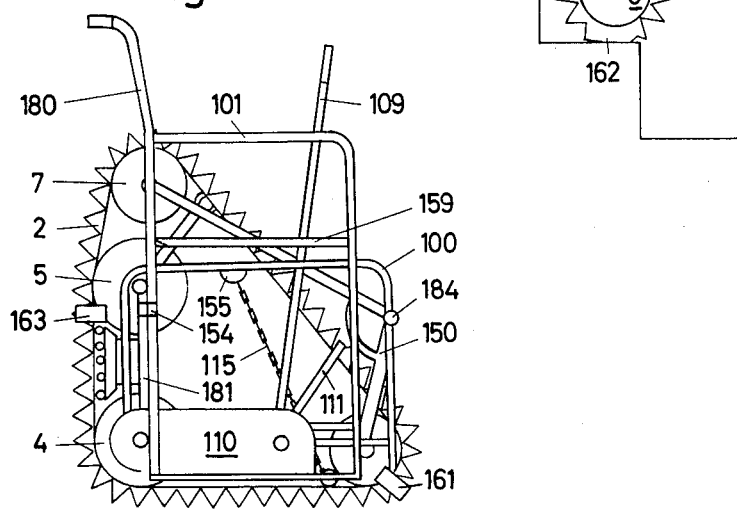
INVENTOR.
RICHARD APPENRODT
BY
Bair, Freeman & Molinare
Attys.

Jan. 25, 1966   R. APPENRODT   3,231,036
STAIR CLIMBING INVALID CARRIAGES
Filed May 11, 1962   9 Sheets-Sheet 6

INVENTOR.
RICHARD APPENRODT
BY
Bair Freeman & Molinare
Attys.

Fig. 19
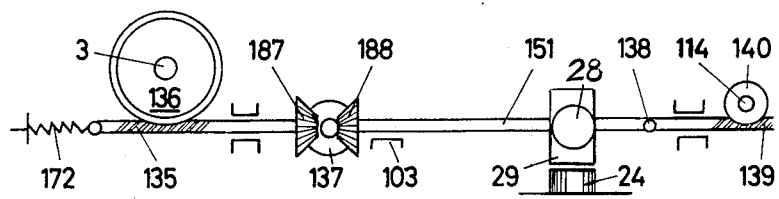
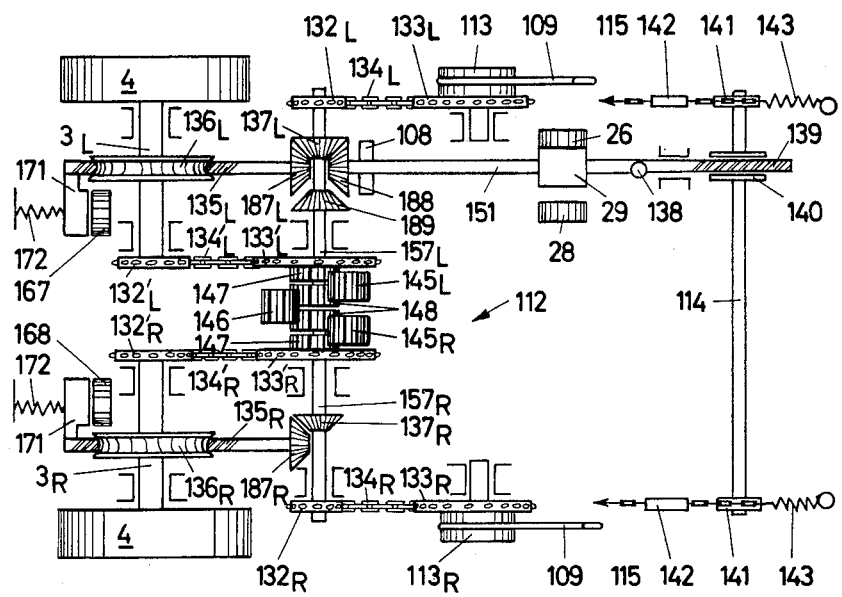
Fig. 15

Jan. 25, 1966  R. APPENRODT  3,231,036
STAIR CLIMBING INVALID CARRIAGES
Filed May 11, 1962  9 Sheets-Sheet 8

INVENTOR.
RICHARD APPENRODT
BY
Bair, Freeman & Molinare
Attys.

Jan. 25, 1966     R. APPENRODT     3,231,036
STAIR CLIMBING INVALID CARRIAGES
Filed May 11, 1962     9 Sheets-Sheet 9

INVENTOR.
RICHARD APPENRODT
BY
Bair, Freeman & Molinare
Attys.

United States Patent Office 3,231,036
Patented Jan. 25, 1966

3,231,036
STAIR CLIMBING INVALID CARRIAGES
Richard Appenrodt, Feldstrasse 4, Benefeld, Germany
Filed May 11, 1962, Ser. No. 194,136
Claims priority, application Germany, May 15, 1961,
A 37,437
14 Claims. (Cl. 180—6.5)

This invention relates to improvements in invalid carriages.

It is an object of the present invention to provide an improved invalid carriage which shall be capable of traveling on a level surface and on stairs.

According to the invention, an invalid carriage comprises a platform, a separate endless track disposed on each of two sides of the platform, a set of track guiding wheels associated with each track and comprising at least a first platform supporting wheel, a second platform supporting wheel disposed rearwardly of said first wheel and a third wheel disposed forwardly and upwardly of said first wheel, said first, second and third wheels being in fixed positions relative to each other during travel of the carriage, and means for supporting each track between said first and third wheels.

The platform, which can form part of a chair or support a seat or chair is advantageously pivotally mounted on the first wheels and is supported on the second wheels by means of a lifting device, for example a scissors or lazy tongs. When the carriage travels up and down a staircase, the lazy tongs are so extended that the platform is constantly located in a horizontal plane.

According to one embodiment of the invention, the drive of the vehicle on a level surface and on stairs is effected by means of manually operable means such as a hand crank, the driving movement of which is transmitted to one of the first and second wheels in each set. In addition, a gearing is provided which can bring the hand crank into driving connection with the lifting lazy tongs for the platform. Depending on the position of the platform when traveling on stairs, the gearing can be so adjusted on movement of the hand crank that the lifting lazy tongs are either extended or lowered.

Naturally, the adjustment of the platform to the horizontal offers the greatest source of error. According to a further feature of the invention, in order to ensure complete safety in this connection, the adjustment of the gearing for actuating the lifting lazy tongs is effected through an electrical control circuit. The platform carries mercury switches which, on displacement of the platform out of the horizontal, energize electromagnetic means according to the attitude of the platform to cause a transmission shaft to the gearing for the lifting lazy tongs to be brought into engagement in one driving direction or the other or to maintain it in the neutral position.

In order to render it possible to turn the carriage, for example on a staircase landing, there is arranged on both sides of the platform a lowerable turning device which includes a rotary buffer and a turning roller which can be lowered into engagement with the ground to relieve the load on one of the endless tracks so that the drive continues to be transmitted only to the other endless track. In this way, the vehicle is turned.

According to another feature of the invention, it is proposed to provide a chair having its back pointing in the direction of travel when climbing up stairs and which is pivotally mounted so as to maintain a substantially level attitude. The chair may be carried on a frame which is so designed that the entire carriage can be folded together to reduce its longitudinal dimensions.

The drive to the carriage may be produced by the patient, namely by way of single-armed laterally mounted levers which transmit the driving movement to a driving axle by way of freewheel couplings.

Adjustment of the chair seat to the horizontal may be effected automatically utilizing the driving force exerted on the levers. As gearing elements for the transmission of the driving force to the endless tracks for traveling on level ground there is provided a chain drive having a relatively large transmission ratio, while, for traveling on stairs, a worm drive having a small transmission ratio or reduction is provided. An adjusting lever for traveling on level ground or on a staircase establishes the particular driving connection required. The gearing is so designed that, when traveling on stairs, the driving axle is driven as a whole, i.e. the drive is transmitted in common to both driving wheels. On changing over to road travel on the other hand, the drive is transmitted separately by the levers to each side of the vehicle.

Instead of the manual drive to the carriage it is possible to provide an electric motor which, when the vehicle travels on stairs, is connected to the supply mains and drives the carriage. Furthermore, it is possible to provide three electric motors operated independently of one another, one of which is allocated to each one of the sides of the vehicle, while the third electric motor provides for the adjustment of the platform or the chair into the horizontal position. Advantageously, a feeler which can be operated by the patient is provided, said feeler switching on the electric motor and interrupting the supply of current when the patient removes his hand from the feeler.

According to a further proposal of the invention, in addition to the endless tracks, conventional wheels are provided as moving elements and, when required, i.e. during travel on the road, can be extended downwardly relative to the vehicle frame and the endless tracks.

According to another feature of the invention, the two sides of the vehicle are connected to one another by way of horizontally arranged lazy tongs which permit a reduction of the width of the vehicle without the seat or chair being lifted in the process. This alteration of the vehicle width can be effected by the patient himself sitting on the chair.

Some embodiments of the present invention will now be described by way of example, reference being made to the accompanying drawings in which.

Figure 1:
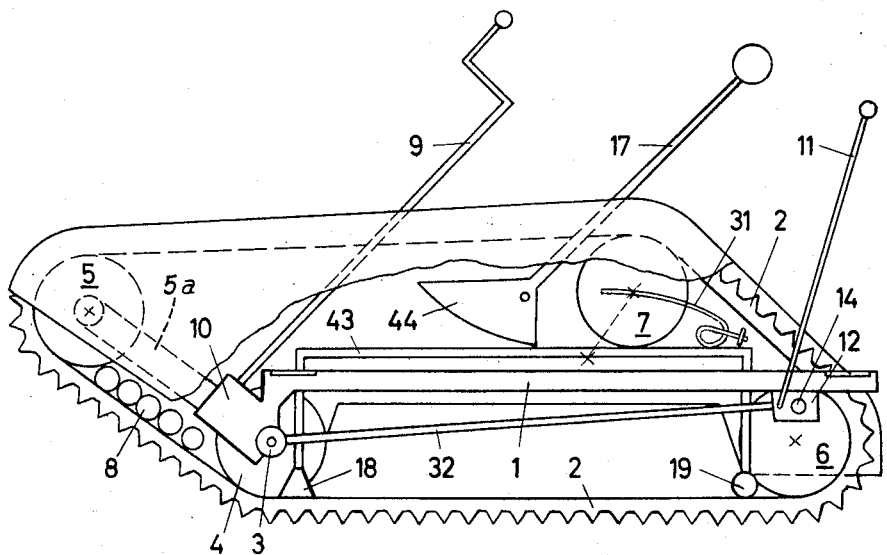
FIG. 1 is a diagrammatic side view of an invalid carriage.
Figure 2:
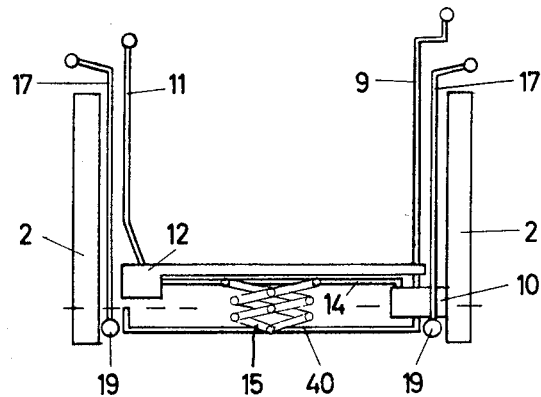
FIG. 2 is a diagrammatic front view of the carriage of FIG. 1.
Figure 3:
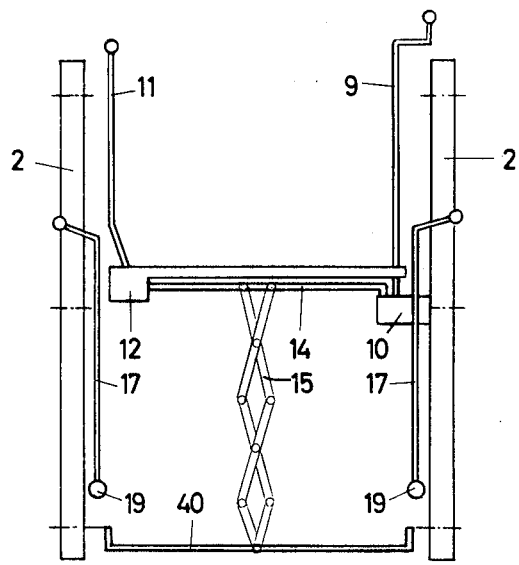
FIG. 3 is a view similar to that of FIG. 2 showing a platform of the carriage in a displaced position.
Figure 4:
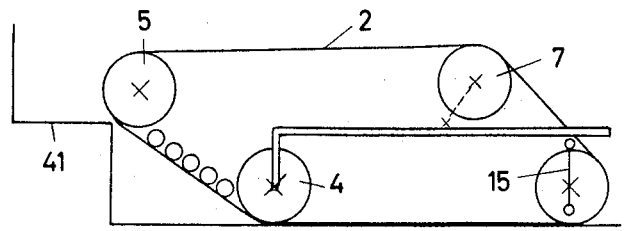
Figure 5:
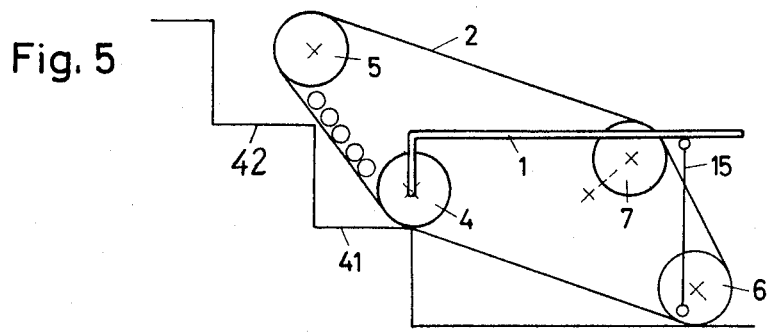
Figure 8:
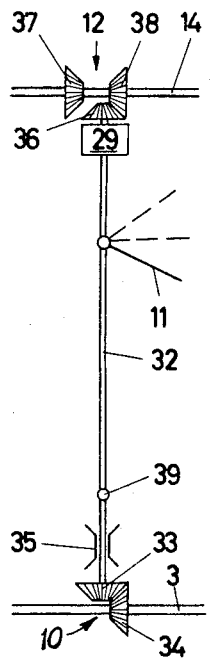
Figure 9:
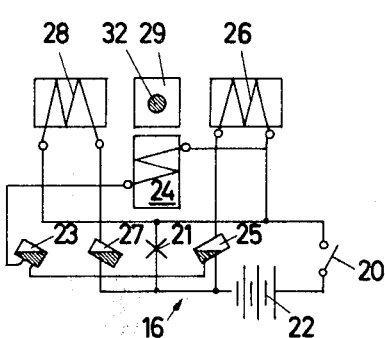
Figure 10:
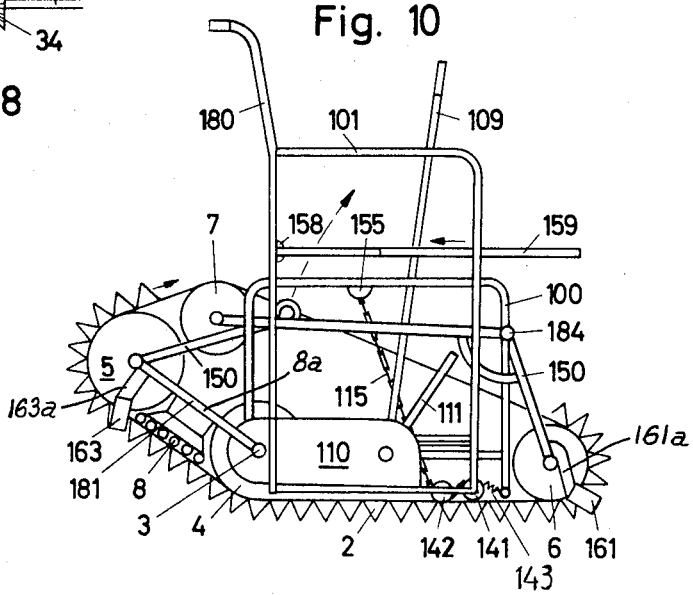
Figure 13:
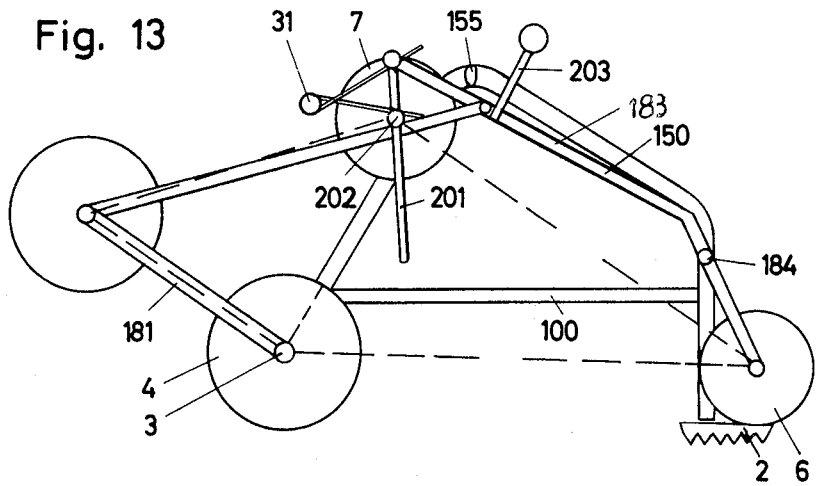
Figure 14:
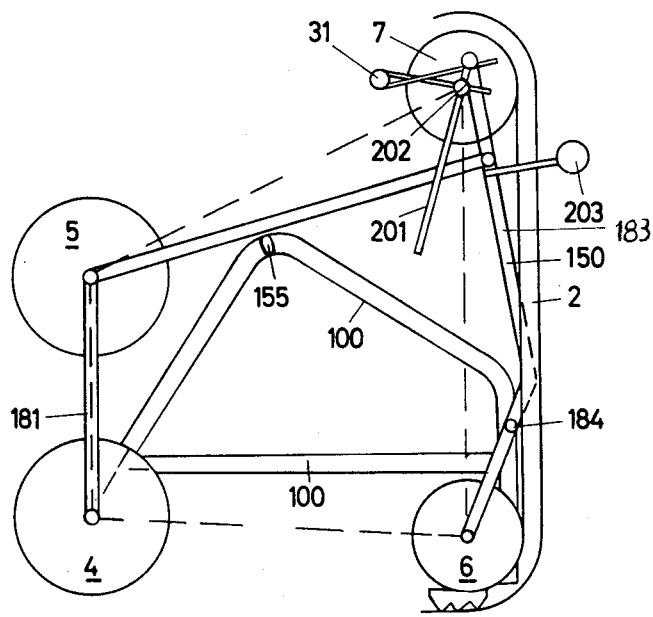
Figure 16:
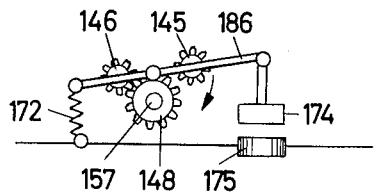
Figure 17:
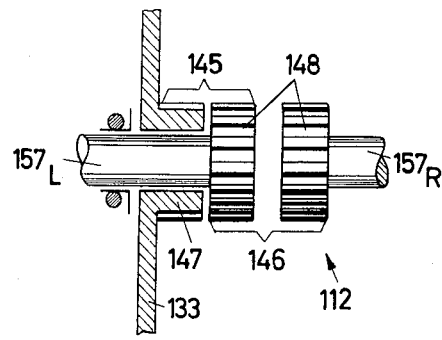
Figure 18:
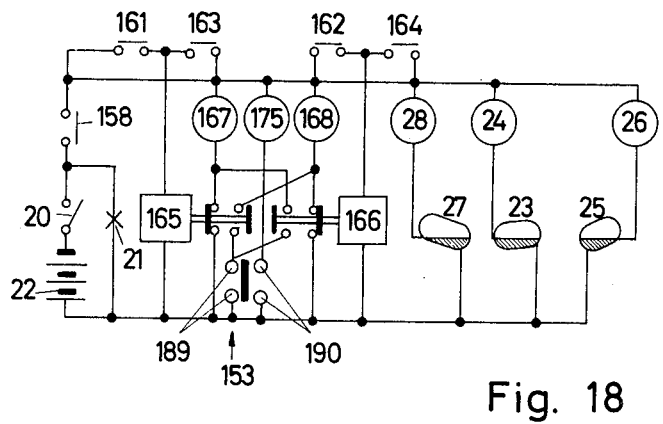
Figure 20:
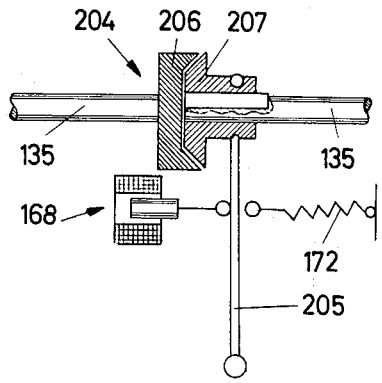
Figure 21:
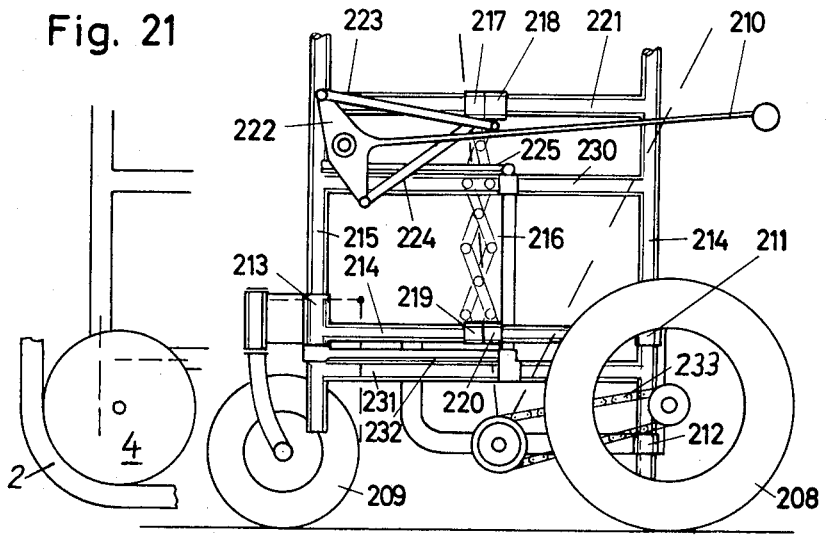
Figure 22:
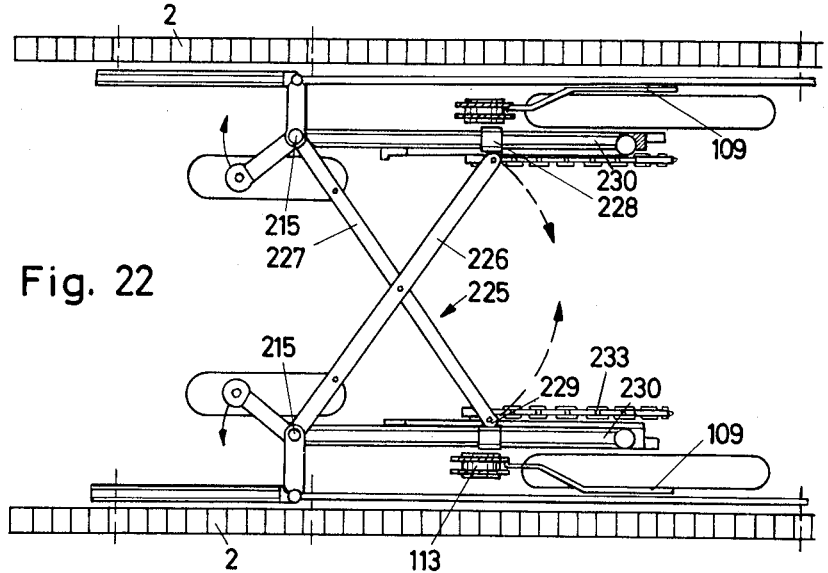

FIGS. 4, 5, 6, and 7 are diagrammatic representations of the essential structural elements of the carriage of FIG. 1 at various stages when traveling on stairs;

FIG. 8 shows a detail of the carriage in diagrammatic plan view;

FIG. 9 shows an electrical control circuit for adjusting the platform of the carriage;

FIG. 10 is a view similar to that of FIG. 1 illustrating an alternative embodiment of the invention;

FIG. 11 shows the embodiment illustrated in FIG. 10 when traveling on stairs;

FIG. 12 shows the embodiment illustrated in FIGS. 10 and 11 in a folded condition when the carriage is traveling on a level surface;

FIG. 13 is a diagrammatic view of a foldable carriage frame in condition for traveling on stairs;

FIG. 14 illustrates the foldable carriage frame of FIG. 13 in condition for travel on the road or other relatively level surface;

FIG. 15 shows the gearing of the carriage in diagrammatic plan view;

FIGS. 16 and 17 show details of the gearing of FIG. 15, FIG. 17 being partially in section;

FIG. 18 is a circuit diagram of an electrical control system for the gearing of FIGS. 15, 16 and 17;

FIG. 19 illustrates a detail of the gearing in side elevation;

FIG. 20 is a sectional detail of the gearing according to FIGS. 15 and 19;

FIG. 21 shows an example of a carriage according to the invention having road wheels which are capable of being extended;

FIG. 22 shows an example of a carriage according to the invention in which the width of the carriage is variable in the transverse direction.

Figure 6:
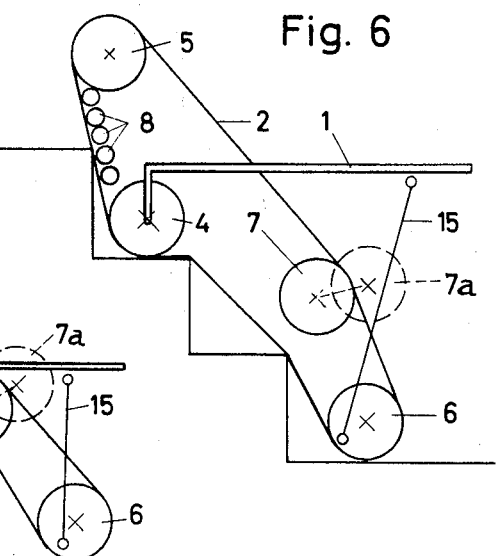
Figure 7:
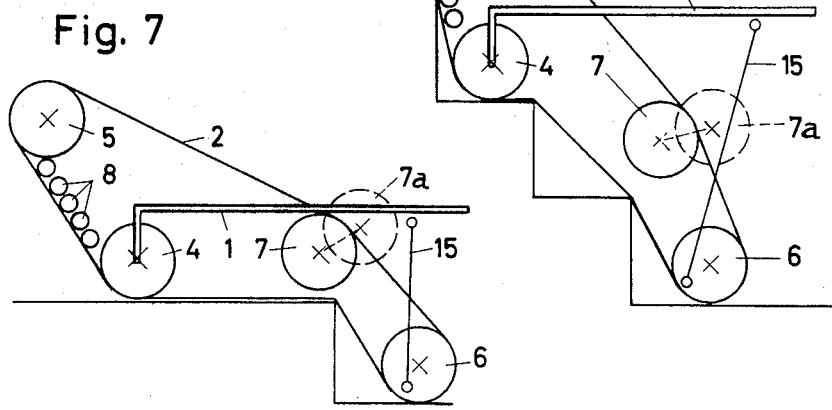

The example illustrated in FIGS. 1 to 9 relates to a basic form of the invalid carriage. In this embodiment a substantially flat horizontal platform 1 is provided on each of two opposed sides with an endless track 2 extending over wheels 4, 5, 6 and 7, the wheels 4 being the driven wheels. The wheels 4, 5 and 6 are arranged in fixed relative positions to one another, while the wheels 7 are radially displaceable against the pressure of a spiral spring 31 for the purpose of maintaining the tension of the endless track 2. The wheels 5 are mounted on links 5ª pivoted to the shaft 3. Rollers 8 are also provided to support a portion of the endless track 2 and may be journaled on brackets 8ª as shown on FIG. 10. The various positions of the wheels 5 and the tensioning wheels 7 which are possible when the vehicle is traveling on a staircase (owing to the deformations of the endless tracks) are illustrated diagrammatically in FIGS. 4 to 7. The original positions of the displaced wheels 7 are shown in FIGS. 6 and 7 in dash lines 7a.

In the embodiment illustrated in FIGS. 1 to 8, the carriage is driven manually by rotation of a crank 9, the motion being transmitted through a gearing 10 to a driving shaft 3 and thence to driving wheels 4.

In order to enable the platform 1 to be maintained in a horizontal position while the carriage is traveling on stairs, the platform is mounted pivotally by its forward end on the driving shaft 3, and its opposite end is carried on a pair of extensible lazy tongs 15 mounted on an axle 40 connecting the wheels 6, the axle 40 being downwardly offset (FIGS. 2 and 3) to accommodate the lazy tongs 15 which are operable by the crank 9. As can be seen in FIG. 8, a driving rod 32 extends from the gearing 10 to a second gearing 12. The driving rod 32 carries a bevel gear 33 at its front end in mesh with a bevel gear 34 mounted on the driving shaft 3. The driving rod 32 is rotatably supported in a bearing 35 in the immediate vicinity of the gearing 10. The other end of the driving rod 32 is provided with a bevel gear 36 which can selectively be brought into engagement with either one of bevel gears 37 and 38 carried on a spindle 14 extending at right angles to the driving rod 32 for the purpose of controlling the lazy tongs 15. The spindle 14 may have right and left-hand threads coacting with the upper ends of the lazy tongs 15 for this purpose. The driving rod 32 is provided in the vicinity of the bearing 35 with an articulation 39 about which that end of the driving rod 32 which is provided with the bevel gear 36 can be swung by means of a shift lever 11 to bring the bevel gear 36 either into engagement with the bevel gear 37 or the bevel gear 38 or to cause it to assume a neutral position between the bevel gears 37 and 38. The transmission of the movements of the shift lever 11 to the driving rod 32 is effected with the inter-position of an elbow lever. Rotation of the spindle 14 in one direction results in a raising of the platform and rotation of the spindle 14 in the opposite direction results in a lowering of the platform. In this example, adjustment of the position of the platform 1 is left to the patient seated on the platform, but in many cases, this is not desirable as the patient may be unable, owing to physical impediment, to carry out the adjustment of the platform himself. For this reason, according to a further feature of the invention, an electrical control circuit is provided which regulates the movements of the lazy tongs 15 automatically. The circuit diagram of this electrical control system is illustrated in FIG. 9. The electrical control system includes a battery 22 and is energized by closing a main switch 20, a pilot lamp 21 being provided to indicate the state of the circuit. The platform 1 carries three mercury switches 23, 25, and 27 respectively associated with electromagnets 24, 26, 28 and arranged to energize the associated electromagnet in accordance with the attitude of the platform 1 to control the position of a metal block 29 carried on the driving rod 32 and hence to control the rotation of the spindle 14.

When the platform 1 is in the horizontal position, the switch 23 is operative to energize the electromagnet 24 and hold the metal block 29 and the driving rod 32 in the neutral or central position in which no drive is imparted to the spindle 14 and hence to the lazy tongs. If a change in the inclination of the platform 1 is sensed by the switches 23, 25 and 27 due, for example to the carriage moving from a level surface on to a staircase or from a staircase to a level surface, then one or other of the switches 25 and 27 is operative to energize its associated electromagnet and attract the metal block 29 together with the driving rod 32 away from the neutral position to one side or the other and cause the bevel gear 36 to engage either the bevel gear 37 or the bevel gear 38 to rotate the spindle 14 and vary the height of lazy tongs 15 in the sense to return the platform 1 to the horizontal position when the electromagnet 26 or 28 is de-energized and the electromagnet 24 is energized. Thus, the platform 1 is maintained automatically by the control circuit in a substantially horizontal attitude. This control can also be produced in like manner by the patient himself by means of the shift lever 11 already described. In this connection, for operating the shift lever 11, the various positions, namely for raising or lowering of the platform and the neutral central position, are indicated visibly by a label or legend.

FIGS. 4 to 7 illustrate diagrammatically the configuration of the endless track and the relative positions of the wheels and the platform when the vehicle is traveling first on a level surface approaching a staircase, then on a staircase and finally leaving the staircase for a level surface. As already stressed, the wheels 4, 5, 6 are arranged in fixed relative positions with respect to one another. When traveling on a level surface (FIG. 4), the wheels 4 and 6 rest with the profiled endless track 2 on the level surface, whereas the wheel 5 overhangs at the front and is raised with respect to the level surface, at an acute angle which must be smaller than the pitch angle or angle of inclination of the staircase. At this stage of the movement of the vehicle each of the two sets of four wheels forms, with the associated endless track 2, a parallelogram. In the region between the front wheels 4 and 5 there are provided on the inside of the endless tracks 2, rigidly mounted pressure rollers 8 which prevent any deformation of the endless tracks 2 in this section. This precaution is important when the front end of the vehicle is traveling over a step of the staircase, as indicated by way of example in FIGS. 5 and 6. In this process the endless track is intended not to be excessively deformed by the sharp edge of the step, but the contour of the endless track is intended to grip the edge, so that the front end is lifted away over the step.

In the second stage (FIG. 5), the wheel 5 and also the driving wheel 4 have moved over the first step 41 and the endless track is resting against the edge of the next step 42 in the region between the wheels 4 and 5. Owing to the unvarying relationship between the wheels 4 and 6, the entire vehicle has thus been moved out of the horizontal starting position into an inclined one. In the platform, this movement has simultaneously been compensated for by a corresponding raising of the lazy tongs 15.

FIG. 6 shows a further stage when the vehicle is traveling on a staircase, namely a stage in which that section of the endless track which is located between the wheels 4 and 6 is also resting on the stairs. This part, however, is deformable, so that there is an inwardly directed deflection of the endless track by the steps. The resulting change in the peripheral length of the track 2 is compensated by a radial displacement of the wheel 7 inwardly against the pressure of the spring 31. The normal initial position of the wheel 7 is illustrated in dash lines 7a in FIGS. 6 and 7. In the stage illustrated in FIG. 6, the entire vehicle adopts the most marked inclination. The platform 1 is, however, maintained substantially horizontal by the lazy tongs 15, these being pivotally connected to the platform 1 and to the axle 40 to take up any change in the horizontal spacing between the axes of the wheels 4 and 6, due to the inclined attitude adopted by the carriage.

Finally, FIG. 7 shows the stage in which the vehicle is leaving the staircase and is swinging back into the horizontal again. Owing to the flexibility of the endless track 2 between the wheels 4 and 6, a sudden tipping of the vehicle is prevented when traveling over the last stair step edge. The lazy tongs 15 are slowly retracted again at the same time.

The individual stages illustrated in FIGS. 4 to 7 for an upwardly directed traveling movement on a staircase are reproduced in the same way on downward travel, since the carriage travels downward in the same position, i.e. without being turned. In the process, the patient sits on the platform fundamentally with his back to the stairs. The gearing 10 is equipped with a self-locking worm drive (not shown) which prevents any unintentional downward travel of the vehicle. Furthermore, the gearing 10 is so designed that, by provision of a suitable change-over device (not shown), the same direction of rotation of the crank 9 is operative for upward travel and downward travel.

In order to be able to turn the carriage during travel, for example on the landing of a staircase, there is provided on both sides of the platform 1 a lifting device comprising a rigid frame 43 having at one end adjacent the wheel 4a rotary buffer 18 adjacent the wheel 4 and at the other end a turning roller 19 adjacent the wheel 6. A separate lever 17 is associated with each frame 43 and is pivotally mounted on the carriage. Each lever 17 carries a skid 44 arranged to engage its associated frame 43 as the lever 17 is swung, which operation of the lever moves the frame 43 downwardly relative to the carriage and relieve to the load on the associated endless track 2, the associated rotary buffer 18 and turning roller 19 then resting on the ground. Continuation of the driving movement by means of the crank 9 causes only one endless track 2 to be effective so that the carriage turns about that rotary buffer 18 resting on the ground, the rear end, bearing on the turning roller 19, following the movement. By means of this device the vehicle can turn practically speaking on the spot.

The carriage described above requires the patient to be lifted or pushed on to the platform 1 with the aid of a special additional chair, for example a bath chair. In the example illustrated in FIGS. 10 to 19, instead of the platform 1, a suitable chair 101 is secured to the vehicle frame, in such manner that during upward travel on a staircase the back 180 points in the direction of travel, i.e. the patient sits with his back to the staircase. The chair 101 is mounted pivotally by the edge located below the back 180 thereof on the driving axle 3 of the driving wheel 4 in a manner similar to the platform 1 of the previous example and its opposite or front edge is supported in such manner as to enable the chair to be pivoted about the rear edge supported on the driving axle 3 to maintain the chair level. Although the lifting tongs 15 of the previous example could be employed for this purpose, the supporting or lifting device of this example comprises a separate chain 115 on each side of the chair which chain is in engagement with two chain wheels 141 and 142 mounted on the chair frame. The ends of each chain 115 are attached to a rigid frame 100 of the vehicle, one end being shown attached at 155 and the other end being connected thereto through a spring 143 in the vicinity of the wheel 6, the spring 143 serving to maintain the tension of the chain 115. The adjustment in height of the front edge of the chair relative to the carriage is effected by a drive to the chain wheel 141, the associated gearing being illustrated in detail in FIGS. 15 and 16 and being described more fully hereinafter.

The example illustrated in FIGS. 10 to 21 has the advantage over the example illustrated in FIGS. 1 to 9 in that it is capable of being folded to occupy a smaller floor space when traveling over a level surface.

To this end, the carriage frame 150 assumes the configuration illustrated in FIGS. 10 and 11 when traveling on a staircase and the configuration illustrated in FIG. 12 when traveling on a level surface. The form of the frame 150, which may advantageously consist of flat bars, is particularly clear from FIGS. 10, 12, 13 and 14. The wheels 6 and 7 are connected by a bar 183 and the wheel 5 is pivotally connected to the bar 183 in the vicinity of the wheel 7 by a further bar 181. The tubular frame 100 of the carriage is pivotally connected to the bar 183 as shown at 184.

The pivoting movements carried out by the individual structural parts of the frame 150 in the frame from the configuration shown in FIG. 10 to that shown in FIG. 12 are illustrated in the folding diagrams of FIGS. 13 and 14. In these views, substantially only those parts of the frame which are important for the folding of the carriage in the longitudinal direction are illustrated. The frame 150 is shown in double lines, while the rigid frame 100 is slightly altered in form in this selected embodiment with respect to the tubular frame of FIGS. 11 and 12. The rigid frame 100 is supported at one end on the driving axle 3 of the wheel 4, so that the wheel 4 remains in a fixed position relative to the rigid frame 100.

It is an essential prerequisite for the foldability of the frame 150 that the sum of the distances between the axes of adjacent wheels 4, 5, 7 and 6 should always remain substantially constant so that the endless track 2 may be maintained under tension. To this end, the wheel 7 is mounted on a swingable arm 201 pivotally mounted on the bar 183 of the frame 150. The wheel 7 is carried on an axle 202 which is mounted on the arm 201 so that it can be shifted longitudinally of the latter. The spacing between the axle 202 and the pivot point of the swinging arm 201 on the bar 183 is determined by a two-legged spring 31 which thereby also holds the endless track 2 under tension. The bars of the vehicle frame 150 connecting the four wheels 4, 5, 6 and 7 are articulated to one another.

The folding of the frame 150 can be carried out by the patient with the aid of a rigid change-over lever 203 mounted on the bar 183. Actuation of this lever 203 initiates a swinging movement of the bar 183 about the pivot 184, whereby the distance between the wheels 4 and 6 is shortened and the wheel 5 is raised in such manner that it is located approximately above the wheel 4. The wheel 7 has likewise been raised and in this process has been shifted on the swinging arm 201 towards the pivot point of the latter against the tension of the spring 31. FIG. 14 shows the folded form of the vehicle frame. The distance between the wheels 4 and 6 has been shortened and the distance between the wheels 4 and 5 has remained the same and likewise the distance between the wheels 6 and 7. The shortening between the wheels 4 and 6 has been compensated by a lengthening of the distance between the wheels 5 and 7.

In the embodiment illustrated in FIGS. 10 to 19, the drive of the vehicle is carried out manually by the patient. However, as shown in FIGS. 10, 11 and 12 and 15, a driving lever 109 is provided on both sides of the chair instead of a crank. To and fro driving movements of this lever 109 are transmitted to the carriage by way of a suitable freewheel coupling 113. The freewheel coupling at the lower end of the driving lever 109 is shown in FIG. 15 together with the entire gearing and is designed to transmit in known manner a driving force to the gearing 110 for reciprocating movements of the lever 109 in only one direction of movement. The coupling 113 includes, in effect, two free-wheel couplings either one of which can be optionally selected by axial rotation of the driving lever 109 to transmit the drive to the gearing 110 to obtain either forward or rearward motion of the carriage. As shown in FIGS. 10–12, the gearing 110 is arranged in the vicinity of the wheel 4 in a housing connected to the frame of the chair 101. In this way, the gearing 110 remains, together with the driving levers 109 at a constant height relative to the chair 101.

In order economically to utilize the driving force exerted on the levers 109 by the patient both for travel on a staircase and on a road or other level surface, different transmission ratios are provided for traveling on stairs and for traveling on the road. When traveling on the road, the driving movement of the levers 109 is transmitted by way of a chain wheel 133 through a chain 134 to another chain wheel 132. The chainwheel 132 is mounted on a shaft 157. The shaft 157, which forms the main driving shaft of the gearing, consists of two parts $157_L$ and $157_R$ which are located symmetrically with respect to the longitudinal central axis of the vehicle. At the outer ends of the parts of the shaft 157 there are arranged chain wheels 132. At the adjacent inner ends of the shaft parts are mounted freely rotatable chain wheels 133. The driving force exerted on the shaft 157 is transmitted by way of these chain wheels 133' through further chains 134' to further chain wheels 132' mounted on the axles 3 of the wheels 4 and thereby to the wheels 4.

For road travel, the arrangement is such that a distance of 0.75 to 1.00 metre is covered with every movement of the lever 109, depending on the size of the chain wheels employed whereas, for traveling on a staircase, a transmission ratio is provided which gives an upward or downward movement of 5–8 cm. for every movement of the lever 109. To make this different driving ratio for stair and road travel possible, before commencement of stair travel or before commencement of road travel an automatic change-over and control device for the gearing is provided and is described in detail hereinafter. This device is actuated by means of a pivotally mounted change-over lever 111. By swinging the change-over lever 111 to stair travel, that part of the gearing 110 which is illustrated in detail in FIGS. 16 and 17 is first altered. Each part of the shaft 157 carries a gear 148 fixedly mounted thereon in the vicinity of the associated chain wheel 133'. Each chain wheel 133' is provided with a toothed hub or gear 147 on that side which faces the associated gear 148. For the "road travel" position of the gearing, the gear 147 and the associated gear 148 are interconnected by a gear 145 mounted in such manner that it can be lifted away, so that when the shaft 157 is driven in the manner described above this driving movement is transmitted by the gear 148 through the connecting gear 145 to the gear 147 and thereby to the associated chain wheel 133'. A further gear 146 is provided in the part 112 of the gearing for drivingly connecting the gears 148 only for staircase travel so that there is no connection between the shafts $157_L$ and $157_R$ during road travel and the two sides of the vehicle can be driven independently of one another.

The gears 145 and 146 are mounted on a pivotally two-armed lever 186 (FIG. 16) carrying an armature 174 arranged to be attracted by an electromagnet when the latter is energized to displace the lever 186 against the effect of a spring 172 from one end position to another. During road travel, the electromagnet 175 is energized to displace the lever 186 and bring the gears 145 into engagement with the gears 147 and 148.

On change-over to stair travel, the supply of current to the electromagnet 175 is interrupted and the spring 172 moves the lever 186 to a position in which the gears 145 are disengaged and the gear 146 comes into engagement with the gears 148 on the facing ends of the shaft parts $157_L$ and $157_R$. In this way, a driving connection is established between the two shaft parts $157_L$ and $157_R$ and the connection with the chain wheels 133' is broken, so that on rotation of the shaft parts $157_L$ and $157_R$ said chain wheel 133' remains at rest.

When the vehicle travels on a staircase, the drive is provided by operation of the levers 109 and is transmitted through chain wheels 133 and 132 and the shaft parts $157_L$ and $157_R$. Due to the changeover operation initiated by means of the lever 111, worm shafts $135_L$ and $135_R$ have respectively been brought into engagement with worm wheels $136_L$ and $136_R$ mounted respectively on the axles $3_L$ and $3_R$. Each shaft part $157_L$ and $157_R$ carries respectively a bevel gear $137_L$ and $137_R$ which are respectively arranged for engagement with bevel gears $187_L$ and $187_R$ carried on the ends of the worm shafts $135_L$ and $135_R$ for stair travel. In this way, the driving connection between the levers 109 and the driving axles $3_L$ and $3_R$ which is operative when the vehicle travels on stairs is established, namely by way of the freewheel coupling 113, the chain wheels 133, the chains 134, the chain wheels 132, the shafts $157_L$ and $157_R$, the bevel gears $137_L$ and $137_R$, the bevel gears $187_L$ and $187_R$ and the worms 135 and the worm wheels 136. The position of the worm shafts $135_L$ and $135_R$ during road or stair travel is determined by electromagnets 167 and 168, respectively. At the ends of the worm shafts $135_L$ and $135_R$ there are arranged respective armatures 171 which, on change-over to stair travel, are attracted by the then energized electromagnets 167 and 168 respectively to displace the worm shafts $135_L$ and $135_R$ and bring them into engagement with the bevel gears $187_L$ and $187_R$. On change-over to road travel, the supply of current to the electromagnets 167 and 168 is interrupted and a return spring 172 displace the worm shafts $135_L$ and $135_R$ in the axial direction in such manner that they are brought out of engagement with the worm wheels 136. At the same time, of course, the bevel gear 187 is likewise brought out of engagement with the bevel gear 137. The worm shafts $135_L$ and $135_R$ are each supported in a bearing 173 (FIG. 19).

As already mentioned, it is intended to maintain the patient's seat substantially horizontal by means of a chain 115 attached at its ends to the tubular frame 100 and which runs over chain wheel 141 and under chain wheel 142 mounted on the chair 101. A gear shaft 151 is provided for driving the chain wheel 141 and, thus, for the adjustment of the chair when the carriage is in an inclined position. The chain wheels 141 on the two sides of the vehicle are interconnected by a shaft 114 carrying a worm wheel 140. One end of the gear shaft 151 indicated at 139, 140 is toothed and meshes with the worm wheel 140. An armature 29 is carried on the gear shaft 151 and is displaceable according to the attitude of the chair by one of three electromagnets 24 (FIG. 19), 26 and 28 (FIG. 15) arranged around the gear shaft 151. The three electromagnets are energized, in the same way as that described in connection with the embodiment of FIG. 9, by way of mercury switches 23, 25 and 27 arranged on the chair. The gear shaft 151 is supported for horizontal displacement in a plane bearing 108. At that end of the shaft 151 which is remote from the toothed end 139 there is arranged a bevel gear 188 which, depending on the energization of the electromagnets 24, 26 or 28, is brought into engagement with the bevel gear $137_L$ or with another bevel gear 189 arranged on the shaft $157_L$ or is held in a neutral position between these bevel gears.

When the patient's chair is inclined to the horizontal, the bevel gear 188 is in mesh with the bevel gear 137$_L$ or the bevel gear 189, and the driving force exerted on the shaft 157$_L$ is also transmitted to the gear shaft 151 and thereby to the shaft 114 and to the chain wheels 141 to return the chair to the horizontal position. When the horizontal position is attained, the supply of current to the electromagnet 26 or 28 is cut off and the electromagnet 24 is energized. During the swinging movements of the shaft 151, the toothed end 139 thereof remains at rest and is supported by a bearing 152, the shaft 151 being pivoted about a universal joint 138.

A further feature of the embodiment illustrated in FIGS. 10 to 21 resides in that, when the vehicle is traveling on a staircase extending in the form of an arc, it adjusts itself automatically to traveling along a curve. To this end, feelers 161 and 162 for one side of the carriage, and 163 and 164 for the other side are provided at those points of the carriage frame (as by brackets 161$^a$ and 163$^a$ shown in FIG. 10) which would first contact the steps during upward or downward travel. The action of these feelers is best explained in connection with the control circuit illustrated in FIG. 18. This control circuit is supplied by a battery 22. Before commencement of the stair travel, the control circuit must be cut in by means of a main switch 20 and the functioning capacity of the control system is then indicated by a pilot lamp 21. The change-over lever 111 for road and stair travel acts on a switch 153 which bridges contacts 189 in the case of stair travel and contacts 190 in the case of road travel. If the switch 153 is in the road travel position (bridging contacts 190), the circuit is closed only by way of the magnet 175 which effects the change-over of the part 112 of the gearing which has been described in connection with FIG. 16. The drive becomes operative by way of the chain wheels 133' and 132'. All the other electromagnets have been released and the bevel gears 187 and 188 are disengaged from the bevel gears 137.

On change-over to stair travel the contacts 189 are bridged and the magnet 175 is released, since the circuit thereto is broken. The change-over of the gearing 112 is effected by the spring 172 (FIG. 16). Control circuit current is supplied to the magnets 167 and 168 through the closed contacts associated with the relays 165 and 166 so that the armatures 171 at the ends of the worm shafts 135$_L$ and 135$_R$ are attracted. In this way, the worm shafts are brought into engagements with the worm wheels 136 and the bevel gears 187 with the bevel gears 137. The drive is now carried out in the manner already described with a low transmission ratio by way of the worm shaft 135 and the worm wheel 136, while the chain wheels 133' and 157$_R$ remain at rest.

If the vehicle traveling on the staircase arrives at a twisting or winding section thereof, then that feeler 161, 162, 163 or 164 which is located on the inside of the bend naturally strikes against the next higher step of the staircase during the climbing or descending action closes its respective switch 161, 162, 163 or 164 as the case may be. In this way, according to the side of the vehicle and according to whether it is traveling up or down, the relay 165 is energized by one of the feelers, for example 161, and its normally closed contacts are opened. The holding magnet 167 is thereby released and the gearing comprising the bevel gear 187, the worm shaft 135 and the worm wheel 136 is put out of action on the particular side of the vehicle which is located on the inside, so that the entire driving force continues to be transmitted only to the endless track 2 located on the outside. In this way, the vehicle performs a swinging movement corresponding to the turn of the stairs until the feeler on the opposite side of the vehicle, for example 162, also comes into contact with the step of the staircase, so that the relay 166 is also energized.

However, the holding magnet 168 is not released by opening of the normally closed contacts of the relay 166, since this holding magnet is located in a closed circuit by way of the operating or normally open contacts of the relay 165. At the same time, the holding magnet 167 is also again energized by closing of the operating or normally open contact in the relay 166, so that the driving connection previously broken is re-established.

Thus, as regards the operation of the feelers when the vehicle is traveling on a winding staircase, it is immaterial whether both relays 165, 166 are energized or both are de-energized.

In addition to the main switches, there is also provided in the above-described control circuit a switch 158 which co-operates with the horizontally displaceable seating plate 159 of the chair 101. This seating plate 159 can be drawn forward in order to make it easier for lame people to get into the bath chair. The seating plate 159 is drawn forward to such an extent that the patient can take his seat on the seating plate without being impeded by the vehicle frame. Thereafter, the patient can push himself back with the seating plate, which is guided in suitable slides, as far as the chair back 180. Of course, with the seating plate drawn forward, the control circuit must not come into operation in any circumstances. For this reason, a switch 158 is mounted on the chair back and closes the control circuit only when the seating plate has been pushed back.

The following supplement to the control circuits according to FIGS. 9 and 18, which is not illustrated in the drawings, should also be mentioned. The foregoing description of these control circuits and the representation thereof in the drawings have been selected for upwardly directed travel on a staircase. Of course, in the case of downward travel, the magnets 24, 26 and 28 must be actuated in precisely the reverse sequence, so that any downwardly directed inclination of the platform or of the chair results in a correspondingly directed rotary movement of the shaft 151, i.e. a raising of the chair or of the platform. Thus, the magnets must be so connected that, on downward travel, the shaft 151 is driven in precisely the opposite way to that in which it is driven on upward travel. Such an adjustment of the magnets can be produced by simple electrotechnical elements, such as relays, and a switch designed for adjustment to upward or downward travel.

The examples of embodiment described show a manual drive of the vehicle, by the patient or sick person himself, that it either by way of a crank or by way of pivoting levers. Of course, it is also possible to carry out the entire drive of the vehicle when traveling on a staircase by means of an electric motor or some other driving assembly.

FIG. 20 shows a detail which can be employed in the gearing shown in FIGS. 15 and 19. It has been stated in connection with FIG. 15 that, during road travel, the worm drive is put out of action by axial displacement of the worm shafts 135$_L$ and 135$_R$. The detail according to FIG. 20 renders possible in this respect a modification in the form of a sliding coupling 204 at the ends of the divided worm shaft 135. Operation of the coupling is likewise effected by means of an electromagnet 168, on the one hand, and by a spring 172 on the other hand. The spring and the magnet armature are connected to an actuating fork 205 for the coupling. On change-over to stair travel, the armature of the magnet 168 is attracted and the actuating fork 205 is swung in such manner that the coupling parts 206 and 207 engage. In this way the driving connection for the worm wheel 136 (see FIG. 15) is established. This form of a shift element may also be employed for driving purposes in road travel by way of the chain drive according to FIG. 15. For example, on the ends of the shafts 3$_L$ and 3$_R$ there may be provided a coupling according to FIG. 20, one part of which is associated with the shaft and the other part with the chain wheel 132' on this shaft.

There is a further possibility of employing the coupling element shown in FIG. 20 for the drive of the shaft 151 for adjusting the chair or the platform to the horizontal. Instead of the swingable shaft 151, which is adjusted by magnets 24, 26 and 28 by means of the armatures 29 (see FIG. 15), couplings can be provided in each instance for the bevel gears $137_L$ and 189 on the shaft 157 and are then actuated by means of magnets in the manner already described. Depending on whether the chair or the platform must be raised or lowered, either the bevel gear $137_L$ or the bevel gear 189 is brought into engagement with the bevel gear 188 arranged on the shaft 151 or, in the normal position, none of the bevel gears is in driving connection. The magnets 24, 26 and 28 and the armature 29 can be dispensed with.

FIG. 21 shows another example of embodiment of the invention in side view. For traveling on a level surface, for example a street or road, it is frequently advantageous to use conventional wheels as moving means. In order to utilize this advantage, in the embodiment shown in FIG. 21 extendable wheels 208 and 209 are provided on both sides of the carriage. By means of a lever 210 which can be operated manually by the patient or sick person, these wheels can be extended downwardly relative to the chair and relative to the endless tracks, so that the tracks are raised with the carriage frame. The raised position of the wheel 4 and endless track 2 are indicated in FIG. 21. The wheels 208 and 209 are mounted in each case by means of vertically displaceable sliding sleeves 211, 212 and 213 on the vertical supports 214 and 215, respectively, of the chair. Only one sliding sleeve 213 of sufficient guiding length is provided for the smaller rear wheel 209, while the larger driving wheel 208 located at the front is held on the support 214 by means of two sliding sleeves 211 and 212 spaced from one another. The sliding sleeves 213 and 211 are interconnected by a rigid strut 214. Thus, this strut can be moved up and down at the same time.

In the example illustrated, the extension or lowering of the wheels 208 and 209 is effected by means of a lifting lazy tongs 216. The ends of the arms of the tongs are pivotally attached at the lower and upper ends to further sliding sleeves 217, 218 and 219, 220. The sliding sleeves 217 and 218 at the upper end of the tongs 216 are mounted to be slidable horizontally on a rigid transverse strut 221 of the chair, while the lower sleeves 219 and 220 run on the vertically slidable connecting strut 214.

The swinging movement of a pivotally mounted lever 210 is transmitted by way of rigid arms 222 and 222′ and by way of rods 223, 224 pivotally mounted at their ends to the sliding sleeves 217 and 218, in each instance in the form of a horizontal displacement. For a downwardly directed movement of the wheels 208 and 209, the sleeves 217 and 218 are drawn together on the strut 221, so that the lazy tongs are extended. As a result, the connecting strut 214, with the sliding sleeves 213 and 211, moves downwardly relative to the chair, whereby the wheels 208 and 209 are extended and the carriage is raised. On the raising of the wheels, a reverse movement takes place.

In many cases, for example when moving through relatively narrow doorways, it is advantageous for the width of the vehicle to be variable. This possibility is provided in the example of embodiment according to FIG. 22, in which the two sides of the vehicle, i.e. the vehicle frames on both sides, are interconnected preferably by two horizontal lazy tongs 225 disposed one above the other. Only one of the lazy tongs is visible in the plan view of FIG. 22. The rearwardly extending ends of the arms 226 and 227 of the lazy tongs are pivotally attached to the vertical supports 215 (see FIG. 21) of the chair. The forwardly extending ends of the lazy tongs are mounted to be horizontally displaceable by means of sliding sleeves 228 and 229 on transverse struts 230 and 231, respectively. The last-mentioned transverse strut 231 of the chair is associated with the lower lazy tongs 232 (not shown in FIG. 22). The movement of the lazy tongs and, thus, the change in the width of the vehicle can likewise be effected by the patient himself, namely by means of a suitable lever which is not shown in detail in the drawings. The advantage of the horizontal lazy tongs resides in that the seat heights of the chair are maintained when the width of the vehicle is changed, whereas in the methods of adjusting the width of invalid chairs by using vertical lazy tongs which have been customarily employed heretofore, the patient or invalid was obliged to leave the chair because of the change in height.

It has already been stated above that the drive is intended to be performed on both sides of the carriage when it is traveling on a staircase. For this reason, the gearing employed must have a through driving axle. In the case of the embodiment illustrated of the gearing illustrated in FIG. 15, this axle is the axle 157. In order nevertheless to enable the width of the vehicle to be altered by means of the horizontal lazy tongs, according to a further feature of the invention it is proposed to provide the through driving shafts with a universal joint at suitable points.

In the embodiment shown in FIGS. 21 and 22, the drive of the front road wheels 208 can likewise be carried out by means of hand levers 109 by way of freewheel couplings 113, the movements of which are transmitted directly to the road wheels 208 by way of chains 233.

I claim:

1. An invalid carriage adapted to move up and down a set of stairs, said carriage comprising a platform, endless tracks positioned on two sides of said platform, a set of track-guiding wheels for each of said tracks, said set of wheels comprising a first wheel including means for pivotally supporting one end of said platform, a second wheel positioned rearwardly of said first wheel, means connected to said second wheel for supporting the other end of said platform in substantially horizontal position while said carriage is moving on said stairs, a third wheel positioned forwardly and upwardly of said first wheel, said first, second and third wheels being in fixed position relative to each other during travel of said carriage, means for supporting each of said tracks between said first and third wheel whereby said tracks engage the corner of a step without any substantial deformation of the tracks, a fourth wheel in each of said sets of wheels, said fourth wheel being mounted for radial displacement, and spring means for urging said fourth wheel into engagement with its associated track, to thereby maintain the tension of said track substantially constant.

2. The invalid carriage of claim 1 including a separate frame for each of said sets of wheels, said wheels being mounted on each of said frames, said frames being adapted to displace said wheels, relative to each other, to reduce the forward displacement of said third wheel relative to said first wheel, while maintaining the sum of the spacings between the axes of adjacent wheels substantially constant, to thereby permit said carriage to be folded for occupying less floor space while being stored while at the same time maintaining tension on said tracks.

3. An invalid carriage comprising a platform, one endless track only positioned on two sides of said platform, a set of track guiding wheels for each of said tracks, said set of wheels comprising a first wheel, a second wheel positioned rearwardly of said first wheel, a third wheel positioned forwardly and upwardly of said first wheel, and a fourth spring-biased track tensioning wheel, means for pivotably connecting said platform to said first wheels, whereby said platform is supported by said first wheels and is rotatable about an axis substantially parallel to the axis of rotation of said first wheels, extensible means for supporting said platform on said second wheels and being operable to angularly displace said platform about its axis, and means for supporting each of said tracks between said first and third wheels.

4. The invalid carriage of claim 3 including electromagnetic means for controlling said extensible means, and switch means, mounted on said platform and responsive to the angular displacement of said platform, for operating said electromagnetic means in opposition to the angular displacement of said platform.

5. The invalid carriage of claim 4, said electromagnetic means comprises first and second electromagnets for increasing or reducing the length of said extensible means, a third electromagnet for stopping the movement of said extensible means, and separate switches mounted on said platform, for each of said electromagnets, said switches being responsive to the angular displacement of said platform for energizing one of said electromagnets.

6. An invalid carriage comprising a platform, one endless track only positioned on two sides of said platform, a set of track guiding wheels for each of said tracks, each of said sets of wheels comprising a first platform supporting wheel, a second platform supporting wheel positioned rearwardly of said first wheel, a third wheel positioned forwardly and upwardly of said first wheel, and a fourth spring-biased track tensioning wheel, said first, second and third wheels being mounted in fixed positions relative to each other, during the travel of said carriage, whereby the angle of inclination of said track, between said first and third wheels, relative to the surface supporting said first and second wheels, is an acute angle, which is less than the angle of inclination of a staircase capable of being mounted by said carriage, a pivotable connection between said platform and said first wheels for permitting angular displacement of said carriage about an axis substantially parallel to the axis of rotation of said first wheels, means for angularly displacing said platform about its axis and for supporting said platform in a selected angular position, and means for supporting each of said tracks between said first and third wheels.

7. An invalid carriage comprising a platform, endless tracks positioned on two sides of said platform, a set of track guiding wheels for each of said tracks, said set of track guiding wheels comprising a first platform supporting wheel, a second platform supporting wheel positioned rearwardly of said first wheel, and a third wheel positioned forwardly and upwardly of said first wheel, a frame for connecting said wheels and for maintaining said wheels in a fixed relative position, during the travel of said carriage, means for supporting said tracks between said first and third wheels, and separate lifting means associated with each of said tracks, said lifting means being adapted to relieve the load on one of said associated tracks for reducing the driving effect of said one track while the other of said tracks is down in the operating position to thereby cause the carriage to turn.

8. The invalid carriage of claim 7 wherein said lifting means comprises a rigid frame carrying a rotary buffer adapted to engage the ground, and a turning roller adapted to engage the ground upon operation of said lifting means.

9. An invalid carriage comprising a platform, one endless track only positioned on two sides of said platform, a set of track guiding wheels for each of said tracks, said set of track guiding wheels comprising a first platform supporting wheel, a second platform supporting wheel positioned rearwardly of said first wheel, a third wheel positioned upwardly of said first wheel, and, during stair travel, being positioned forwardly of said first wheel, and a fourth spring-biased track tensioning wheel separate manually operable driving levers positioned on each side of said platform, and free-wheel coupling for connecting each of said levers to said first wheels.

10. An invalid carriage comprising a platform, endless tracks positioned on two sides of said platform, a set of track guiding wheels for each of said tracks, said set of wheels comprising at least a first platform supporting wheel, a second platform supporting wheel positioned rearwardly of said first wheel, a third wheel disposed upwardly of said first wheel, and, during stair travel, being positioned forwardly of said first wheel, and a fourth spring-biased track tensioning wheel, manually operable means for driving one of said first and second wheels in each of said sets, gearing for drivingly connecting said manually operable means to said one of said first and second wheels, and means for varying the transmission ratio of said gearing.

11. An invalid carriage comprising a chair, endless tracks positioned on two sides of said chair, a set of track guiding wheels for each of said tracks, said set of wheels including a first chair supporting wheel, a second chair supporting wheel positioned rearwardly of said first wheel, and a third wheel positioned upwardly of said first wheel, and, during stair travel, being positioned forwardly of said first wheel, means for driving one of said first and second wheels, gear means associated with each of said tracks and being operable to transmit the drive from said driving means to said one of said first and second wheels, an electrical control circuit for causing said gear means to become inoperative, and a plurality of feeler members mounted on said carriage and being responsive to engagement thereof with a solid surface, whereby said control circuit and said gear means disengage the drive from one of said tracks.

12. An invalid carriage comprising a chair, one endless track only postitioned on two sides of said chair, a set of track guiding wheels for each of said tracks, said set of wheels including a first chair supporting wheel, a second chair supporting wheel positioned rearwardly of said first wheel, a third wheel positioned upwardly of said first wheel and, during stair travel, being positioned forwardly of said first wheel, and a fourth spring-biased track tensioning wheel, means for driving said wheels, gear means associated with each of said tracks and being adapted to transmit the drive from said driving means to said wheels, an electrical control circuit for causing said gear means to assume a non-drive condition, a seat member displaceable relative to the main portion of said chair, and switch means incorporated within said electrical control circuit to prevent transmission of drive to said tracks when said seat is displaced from a predetermined position.

13. An invalid carriage adapted to move up and down a set of stairs, said carriage comprising a platform, endless tracks positioned on two sides of said platform, a frame for each of said tracks, a set of track guiding wheels associated with each of said tracks, said set of wheels comprising a first wheel including means for pivotally supporting one end of said platform, a second wheel positioned rearwardly of said first wheel, means connected to said second wheel for supporting the other end of said platform in substantially horizontal position while said carriage is moving on said stairs, a third wheel disposed forwardly and upwardly of said first wheel, and a fourth spring-loaded track tensioning wheel, said frame being adjustable from one configuration in which said third wheel is disposed forwardly of said first wheel for stair travel to a second configuration in which said third wheel is positioned less forwardly of said first wheel for level travel, whereby said carriage occupies a reduced floor space when said frame is in said second configuration, in both of said configurations, the distances between adjacent wheels in a set is maintained substantially constant, and means for supporting each of said tracks between said first and third wheels whereby during stair travel said tracks engage the corner of a step without any substantial deformation of the tracks.

14. An invalid carriage adapted to move up and down a set of stairs, said carriage comprising a chair, endless tracks positioned on two sides of said chair, a set of track guiding wheels for each of said tracks, said set of wheels comprising a first wheel including means for pivotally supporting one end of said chair, a second wheel positioned rearwardly of said first wheel, means connected to said second wheel for supporting the other end of said chair for maintaining it in substantially horizontal position while said carriage is moving on said stairs, a third wheel positioned upwardly of said first wheel, and a fourth spring-loaded wheel in engagement with an associated track for maintaining it in tension, a separate articulated frame for carrying each of said sets of wheels and being adapted to have a first configuration in which the third wheel is disposed forwardly of said first wheel and a second configuration in which said third wheel is disposed less forwardly of said first wheel, and the spacing between said first and second wheels being reduced, the sum of the distances between adjacent wheels being substantially the same for both configurations of said frames.

References Cited by the Examiner
UNITED STATES PATENTS

| | | | |
|---|---|---|---|
| 838,228 | 12/1906 | Williams | 280—242 |
| 2,046,560 | 7/1936 | Johnson | 180—9.22 |
| 2,393,309 | 1/1946 | Cochran | 180—9.22 |
| 2,541,943 | 2/1951 | Sherman et al. | 180—9.5 X |
| 2,572,910 | 10/1951 | Brown | 280—6.1 |
| 2,578,828 | 12/1951 | Nelson | 280—242 |
| 2,592,023 | 4/1952 | Gleason. | |
| 2,751,027 | 6/1956 | McLaughlin | 180—9.24 |
| 2,765,860 | 10/1956 | Church | 180—9.24 X |
| 2,856,014 | 10/1958 | Garnier | 180—9.3 |
| 2,990,900 | 7/1961 | Palsson | 180—9.2 X |
| 3,068,950 | 12/1962 | Davidson | 180—9.24 |

FOREIGN PATENTS 693,983   7/1953   Great Britain.

OTHER REFERENCES

McLaughlin (2).—Wanted—A Stair Climbing Wheel Chair, pages 27–38, January 1962.

BENJAMIN HERSH, *Primary Examiner*.

ARTHUR L. LA POINT, *Examiner*.